H. F. KRANTZ.
SELF ACTUATING SAFETY PANEL.
APPLICATION FILED APR. 16, 1918.
Reissued July 30, 1918.
14,498.
3 SHEETS—SHEET 1.
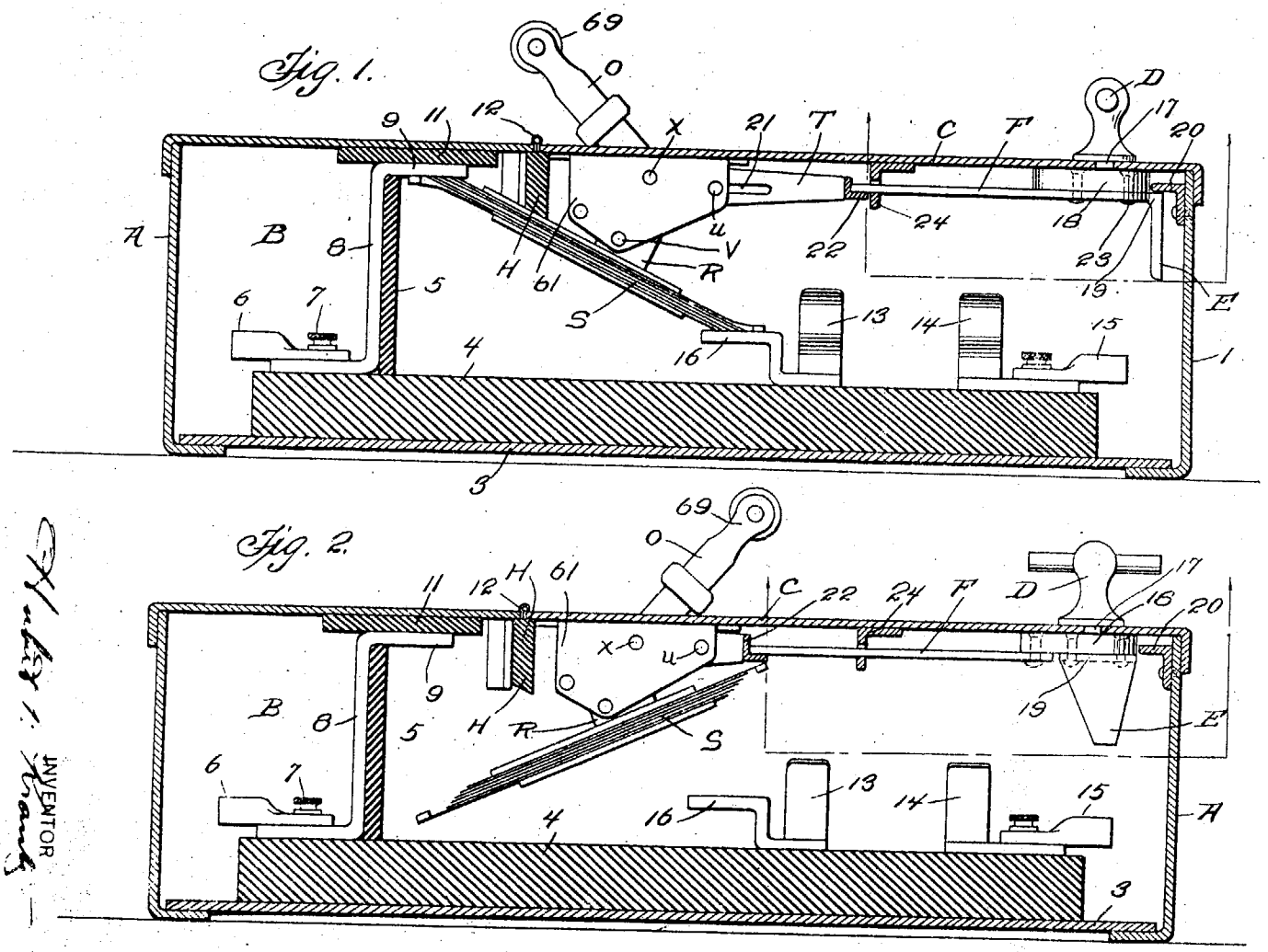
INVENTOR
BY
ATTORNEY

H. F. KRANTZ.

SELF ACTUATING SAFETY PANEL

APPLICATION FILED APR. 16, 1918.

Reissued July 30, 1918.

14,498.

3 SHEETS—SHEET 2.

INVENTOR

Hubert F. Krantz

BY

L. Bruford Hardy

Jr. ATTORNEY

H. F. KRANTZ.
SELF ACTUATING SAFETY PANEL.
APPLICATION FILED APR. 16, 1918.
Reissued July 30, 1918.
14,498.
3 SHEETS—SHEET 3.
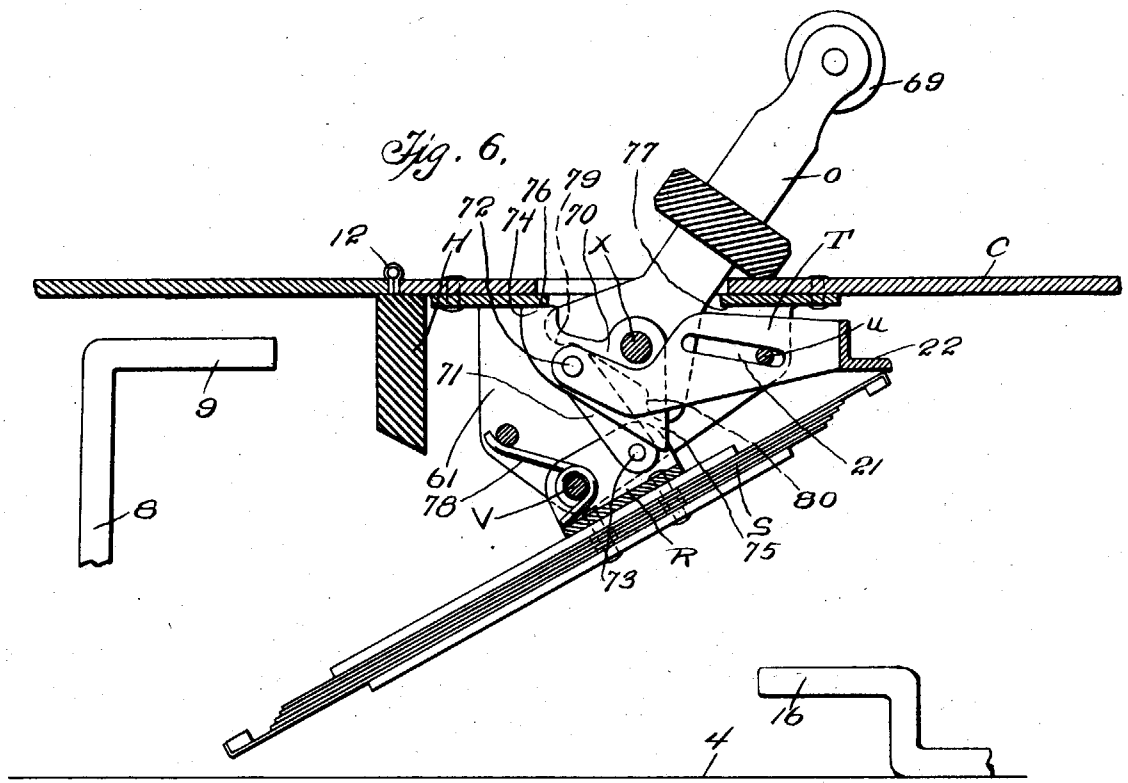
INVENTOR
Hubert F. Krantz
BY
L. Bruce Hardy
ATTORNEY

BEST AVAILABLE COPY

UNITED STATES PATENT OFFICE.

HUBERT F. KRANTZ, OF BROOKLYN, NEW YORK, ASSIGNOR TO KRANTZ MANUFACTURING COMPANY, INC., OF BROOKLYN, NEW YORK, A CORPORATION OF NEW YORK.

SELF-ACTUATING SAFETY-PANEL.

14,498. Specification of Reissued Letters Patent. Reissued July 30, 1918.

Original No. 1,248,431, dated November 27, 1917, Serial No. 79,094, filed February 18, 1916. Application for reissue filed April 16, 1918. Serial No. 228,981.

*To all whom it may concern:*

Be it known that I, HUBERT F. KRANTZ, residing at Brooklyn, in the county of Kings and State of New York, have invented certain new and useful Improvements in Self-Actuating Safety-Panels, of which the following is a specification.

This invention deals with certain improvements in safety panel boxes designed to afford more convenient access for purposes of inspection and replacement of safety fuses and it embodies certain of the broader features claimed in my copending case No. 42,956; adding thereto certain further provisions in the construction of safety panel boxes.

Among other objects, this invention proposes an arrangement such that the door cannot be either opened or closed save when the switch blade is in open circuit position, and such that an attempt to either open or close the door will throw the blade into set or off position.

Another object is to provide means whereby the opening of the door will shift the make-and-break mechanism into fully exposed view.

A further object is to provide a plurality of operating means for the switch blade, with certain relations between them such as to control the movements of the door in accordance with the position of the switch blade.

Other objects will be in part obvious from the annexed drawings and in part indicated in connection therewith by the following analysis of this invention.

This invention accordingly consists in the features of construction, combinations of parts, and in the unique relations of the members and in the relative proportioning and disposition thereof; all as more completely outlined herein, and the scope of protection contemplated will be indicated in the appended claims.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views of which:

Figure 1 represents the invention in longitudinal cross-section with the switch blade in closed circuit position.

Fig. 2 shows the same with the blade in open circuit position.

Fig. 6 is an enlarged detail sectional view illustrating the toggle mechanism for operating the switch blade, said mechanism being similar to that shown and described in my copending application above referred to.

Figure 3:
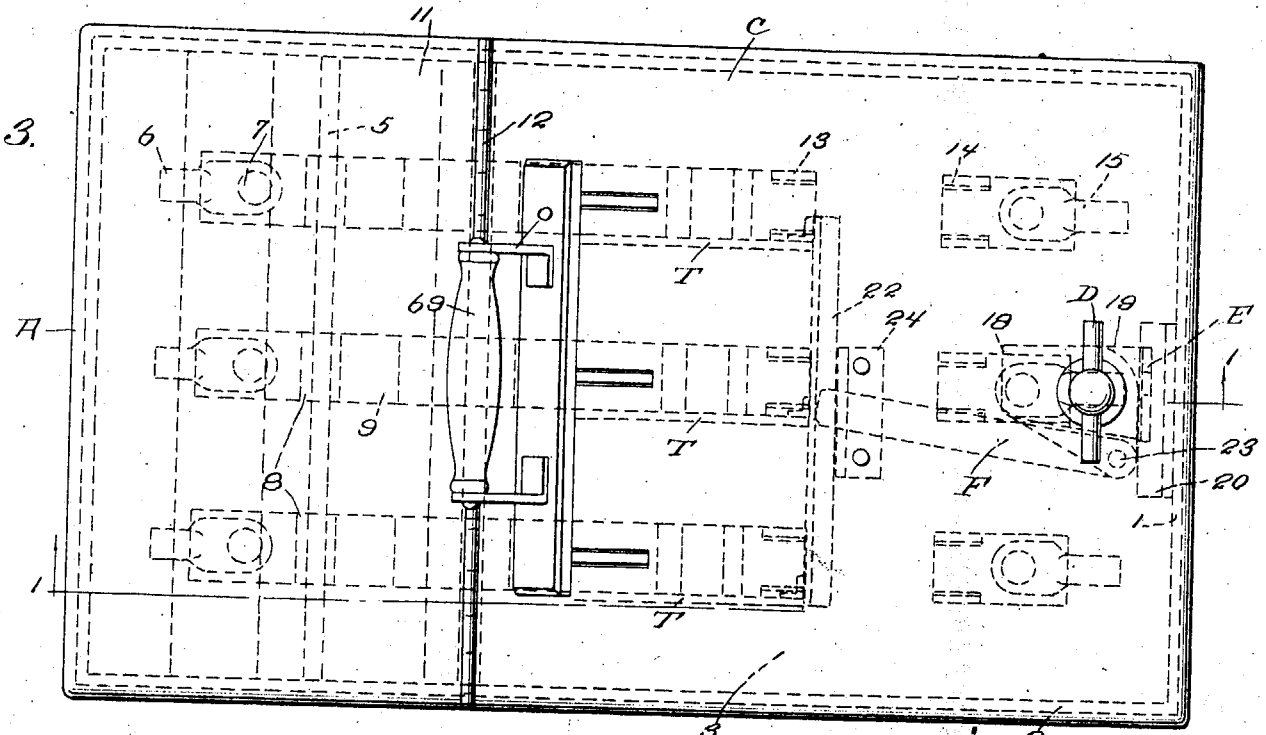
Fig. 3 is a plan of this apparatus.
Figure 5:
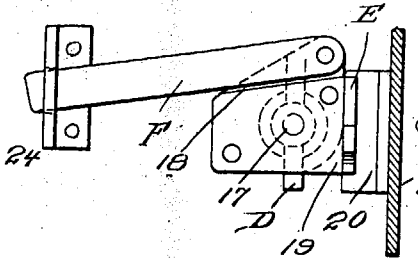
Figs. 4 and 5 are details showing the operation of the door lock.
Figure 4:
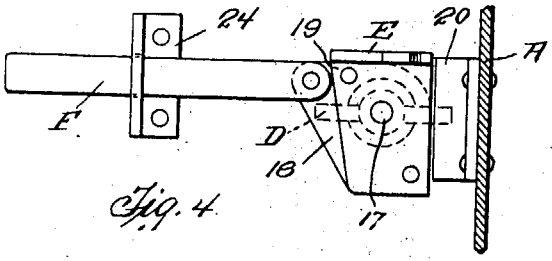

Referring to the drawings, A designates generally a structure in the nature of a box or other suitable inclosure which may be constructed in various ways, as for example, by means of sheet metal sides and ends 1 and 2 connected, if desired, with a similar floor member 3, and interiorly providing a base-plate 4 of insulating material which is utilized as a mounting for one or more terminal elements. As here shown, associated with this base-plate is a partition 5 of insulating material which divides the interior of the box into a gutter or channel B carrying the leading-in wires from the main supply and containing the terminals 6 thereof which, by means of suitable screws 7, are connected directly to main-line switch terminals 8. The terminals 8 are each of Z-shape. They extend upwardly along the gutter side of the partition 5 and protrude over said partition so as to provide contact portions 9 against which the switch blades may directly bear. An insulating strip 10 surmounts these various main-line terminals and intervenes between the same and the fixed or stationary portion 11 of the cover of the box. It is to be understood that this portion 11 need only be removed in rare instances, as in case of anything happening to the leading-in wires within the gutter B, and it is, therefore, normally closed.

The remaining space of the safety panel box is occupied by the make-and-break mechanism and by the fuse terminals. The current carrying parts are inclosed and protected whenever they are "live," by means of one or more doors C serving as an obstructing element to prevent the hand of

BEST AVAILABLE COP the user from touching any "live" parts. This door, however, is so arranged, as for instance by means of the hinge or its equivalent 12, that it may be displaced or shifted out of its normal position to permit access into the box, especially for the purpose of replacing fuse units, or to provide for inspection of the switch blades and their operating mechanisms.

In the illustrated embodiment of this invention inspection is very conveniently provided for by mounting a part of the make-and-break mechanism on the shiftable door C so that when the door has been opened, the make-and-break mechanism will be brought into a very accessible inspection position.

The general arrangement is such that whenever the door is displaced, and access is thereby afforded to the interior of the box, the fuse units, and the switch blades, all are necessarily "dead."

The particular mechanism here resorted to for disclosing this mode of operation is constructed as follows:

Mounted on the base board 4 are two fuse terminals 13 and 14 which are adapted to act as spring clips to permit a ready substitution of any suitable fuse units.

These terminals 13 and 14 are merely typical of any variety of socket or arrangement adapted separately to receive fuse units. The terminal 14 is connected with a branch line circuit by means of a part 15, and the terminal 13 is connected preferably directly with a contact piece 16 which receives the current from a suitable switch blade S when in contact therewith. Preferably this contact 16 is complementary to the contact 9 and is arranged opposite the same diagonally across the axis of rotation of the switch blade S. The switch blade is mounted to rock about the axis V, and is actuated by grasping the handle 69 and thereby swinging the arm O about its axis $x$, and thus, by means of the toggle mechanism, illustrated in detail in Fig. 6, causing the switch blade S to be forced into and locked in its "closed circuit" position against the contacts 9 and 16, or permitted to snap into "open circuit" position by spring action.

While it will be understood that any suitable type of switch mechanism may be employed wherewith to swing the switch blade S in response to the movements of an operating handle, the mechanism illustrated in the drawings includes a pair of toggle links 70 and 71 pivotally connected together as at 72. The link 70 is mounted upon the pivot $x$, while the link 71 is pivotally connected, as at 73, to the blade-carrying plate R at one side of the pivot V. When the toggle is made the pivot 73 is, of course, moved downwardly so that the blade is swung into the position shown in Fig. 1, while when the toggle is broken, the blade stands in the "off" position as in Figs. 2 and 6.

The link 70 is provided with extension parts 74 and 75 for engaging against the surfaces 76 and 77 respectively to determine the two positions of the toggle.

A spring 78 normally retains the blade in "off" position.

The inner end of the lever O is provided with spaced opposing shoulders 79 and 80 so arranged as to engage the knee of the toggle for actuating the toggle and at the same time for providing ample lost motion to enable the toggle to snap "off".

A door-locking handle D is, in this embodiment, preferably arranged so as to be bodily movable with the door itself so that it may be used not only for unlocking the door but also as a finger grip for bodily displacing the door during its own shift in space, although it may be arranged so as to perform the former function alone by providing the door with a separate finger grip to be used for shifting the door after it has been unlocked by actuation of the other.

The handle D is fixed to a pivotally mounted shaft 17 to which is also affixed a rotatable plate 18 on the inner side of the door C. Extending from this plate 18 is a locking latch 19 which is adapted to catch underneath a lip 20 secured to a stationary part of the box and thereby to prevent the door from being opened when the handle is in the position shown by Fig. 1.

The construction is also such that the door cannot be moved to closed position when the handle is in locking position, and this is accomplished by means of a second projection E which is arranged so that it will impact the upper surface of the lip 20 should an attempt be made to close the door when the handle is in the wrong position.

Now this invention furthermore proposes a connection between the handle D and the switch mechanism such that the door can neither be opened nor closed save when the switch is in open circuit position; and furthermore such that an operation of the handle into unlocking position will result in a shifting of the switch blade into its open circuit position.

The switch mechanism presents in addition to the actuating lever O a second actuating member T which is effective to cause the switch blade to move into its open circuit position; in this instance by breaking the toggle. While it may be connected, in any desired manner, to move the blade into open circuit position, as here illustrated it is connected with the knee of the toggle. It is formed with a slot 21 for receiving a guide pin $u$.

If the part T be pushed to the left, it will break the toggle and cause the switch S to

BEST AVAILABLE COP swing into its open circuit position. Likewise, if the arm O be swung into the position shown by Fig. 1 then, of necessity, the part T will be moved toward the right as shown in Fig. 1, in which case the switch S establishes electrical connection.

An interponent F intervenes between the part T, or the rail 22 connecting a plurality of similar parts T, and the handle D in such a manner that when the handle D is in the position shown by Figs. 2 and 6, (permitting the door to open) the part T must, of necessity, be in its "open circuit" position; and conversely, when the part T is in its "closed circuit" position, interponent F compels the handle D to assume the position shown by Fig. 1, thereby preventing the door from being opened, if it be closed; or from being closed if it be open. This effect is conveniently attained by pivoting the interponent F to the plate 18, as by means of the pivot 23, and by causing its other end to be guided by a part 24 into proper relation with the cross rail 22.

It should be pointed out that the handle D, with the parts directly connected to be operated thereby, constitutes an auxiliary manual control means for the switch blade in that said parts are capable, independently of the main operating or control arm O, of controlling movement of the switch blade from one of its positions to another at certain times. The effectiveness of this auxiliary control means is dependent upon the position both of the movable door and of the main control means for the reason that the switch blade can never be in the "on" position except when the handle is thrown to a corresponding position, and it even then is never in engagement with the opposite contact terminals except when the door is closed. Thus the position of the door, which constitutes a part of the protecting casing for the switch blade, determines the effectiveness of the auxiliary control means.

As many changes could be made in this construction without departing from the scope of the following claims, it is intended that all matter contained in the above description, or shown in the accompanying drawings, shall be interpreted as illustrative only and not in a limiting sense.

Having thus revealed this invention, I claim as new and desire to secure the following combinations of elements, or equivalents thereof, by Letters Patent of the United States.

1. A switch mechanism combining a casing having an opening thereinto, a switch blade, manual control means for the switch blade, a displaceable closure member for said opening, a manually operable lock operable independently of the manual control means for the switch blade for preventing displacement of said closure member, and means for causing said switch blade to assume open circuit position as said lock is manually moved into unlocking position.

2. A switch mechanism combining a casing having an opening thereinto, a switch blade, manual control means for the switch blade, a displaceable closure member for said opening, a manually operable lock operable independently of the manual control means for the switch blade for preventing displacement of said closure member, and connections between said switch blade control means and said lock for moving said lock into locking position when said switch blade is thrown into closed circuit position.

3. A switch mechanism combining a casing having an opening thereinto, a switch blade, manual control means for the switch blade, a displaceable closure member for said opening, an element operable to displace the closure member, a part movable by said element to lock the closure member against displacement, and connections between said part and said switch blade whereby to constitute an auxiliary control means for the switch blade.

4. A switch mechanism combining a casing having an opening thereinto, a switch blade, manual control means for the switch blade, a displaceable closure member for said opening, a handle mounted on said closure member having a part to lock said closure member, said handle being adapted to be actuated first to unlock the closure member and then to displace it, and means whereby the handle constitutes part of an auxiliary control means for the switch blade operable to cause the switch blade to assume an open circuit position when said closure member has been unlocked.

5. A switch mechanism combining a casing having an opening thereinto, a switch blade, manual control means for the switch blade, a displaceable closure member for said opening, a manually operable lock operable independently of the manual control means for the switch blade for preventing displacement of said closure member, and means whereby said lock constitutes an auxiliary manual control means for the switch blade.

6. A switch mechanism combining a casing having an opening thereinto, a switch blade, manual control means for the switch blade, a displaceable closure member for said opening, means independent of said switch blade control means effective to prevent closure of the closure member when said switch blade is in closed circuit position, and said last means comprising an auxiliary manual control medium for the switch blade.

7. A switch mechanism combining a casing having an opening thereinto, a switch blade, manual control means for the switch blade, a displaceable closure member for said

BEST AVAILABLE COPY opening, means independent of the switch blade control means for preventing said closure member from being opened when said blade is in closed circuit position, and said last means comprising an auxiliary manual control medium for the switch blade.

8. A switch mechanism combining a casing, a pair of contacts fixed within said casing spaced apart, the casing having an opening thereinto, a door for said opening movable into two positions, a conductor member mounted upon the door adapted to be shifted bodily by movement of the door into and out of a position intermediate said pair of contacts, manual control means for shifting said conductor member operable when the conductor member is in position intermediate said contacts to move the conductor member into and out of engagement with both of said contacts, and means independent of said manual control means for preventing movement of the conductor member into position intermediate said contacts except when the conductor member has been operated by said manual control into its non-engaging position.

9. A switch mechanism combining a casing having an opening thereinto, a door displaceable to open and close said opening, a switch blade connected to be shifted into functioning position by closing said door, manual control means for the switch blade, and means independent of said switch blade control means for causing said switch blade to assume its open circuit position whenever said door is either opened or closed.

10. A switch mechanism combining a casing having an opening thereinto, a switch blade, manual control means for the switch blade, a displaceable closure member for said opening, auxiliary control means for the switch blade, and means whereby the effectiveness of the auxiliary control means is determined by the position of the closure member.

11. A switch mechanism comprising a movable contact part, control means therefor, auxiliary control means for said movable contact part, a protecting member for the switch mechanism, said protecting member having a movable part, and means whereby the effectiveness of the auxiliary control means is determined by the position of the movable part of the protecting member.

12. A switch mechanism having a movable blade, an operating handle for moving said blade, a protecting member for protecting said blade, said protecting member having a displaceable part displaceable to give access to said blade, auxiliary control means for the blade, and means whereby the effectiveness of said auxiliary control means is determined by the position of said displaceable part.

13. A switch mechanism combining a casing having an opening thereinto, a door for the opening pivotally mounted to swing into and out of closing position, a switch mechanism carried by the door to swing therewith and comprising a double-ended switch blade pivoted intermediate its length to swing its opposite ends into and out of functioning position, and a pair of contacts for the respective ends of the switch blades arranged with respect to the door hinge so that when the door is swung open the ends of the switch blade will move in opposite directions away from their respective contacts.

14. A switch mechanism combining a casing having an opening thereinto, a door for the opening hinged to swing into and out of closing position, a contact member arranged within the casing, a switch mechanism carried by the door to swing therewith, a barrier arranged within the casing between said contact member and said opening to render the contact member practically inaccessible from said opening when the door is open, and the switch mechanism comprising a contact part which swings about said barrier into and out of position for functioning with said contact member when the door is closed or opened.

15. A switch mechanism comprising a casing having an opening thereinto, a closure part for said opening, said casing providing a compartment having an overhanging cover ledge adjacent the opening, a contact member terminating at the under face of said ledge, a switch device for coöperating with said contact member, and a barrier arranged within the compartment between said contact member and said opening to render said contact member practically inaccessible from said opening when said closure part is removed.

16. A switch mechanism combining a casing having an opening thereinto, a displaceable closure member for the opening, a latch for the closure member adjacent one edge thereof, a switch mechanism adjacent the opposite edge of the closure member, and connections extending from the latch across the closure member to the switch mechanism operative to cause the switch mechanism to assume open circuit position when the latch is operated to release the closure member.

17. A switch mechanism combining a casing having an opening thereinto, a closure member, for the opening movable into and out of closing position, a latch for retaining the closure member closed, a switch device movable into "on" and "off" positions, the latch comprising a handle part and a locking plate rotatable by the handle part into and out of locking position, a member connected with the locking plate and extending therefrom into operative relation with the switch device adapted to insure an off position of the switch device when

BEST AVAILABLE COPY the locking plate is in unlocking position, and an extension formed upon the locking plate operable when the closure member is being closed to constitute a stop for engaging against an opposing surface portion of the casing to prevent movement of the closure member into near closing position except when the locking plate is in unlocking position.

18. A switch mechanism combining a casing having an opening thereinto, a door for said opening movable into two positions, a switch mechanism including a switch blade, manual control means for said switch blade, and means operable independently of said mentioned manual control means for causing the switch blade to assume its open circuit position whenever the door is in one of its positions.

19. A switch mechanism comprising a pair of contacts fixed in spaced relation to each other, a pair of movable contacts for cooperating with the fixed contacts, operating means to cause the movable contacts to move in opposite directions away from the fixed contacts respectively, and other means selectively operable also to cause the movable contacts to move in opposite directions away from the fixed contacts.

20. A switch mechanism combining a casing having an opening thereinto, a door for said opening movable into two positions, a pair of contacts fixed within said casing spaced apart, a pair of movable contacts for coöperating with the fixed contacts, operating means to move the movable contacts in opposite directions away from the fixed contacts respectively, other operating means selectively operable also to move the movable contacts in opposite directions away from the fixed contacts, and the structure being of a character such that movement of the door in one direction also will effect movement of the movable contacts in opposite directions away from the fixed contacts.

21. A switch mechanism combining a casing having an opening thereinto, a door for the opening movable into two positions, a pair of contacts arranged within the casing spaced apart, a switch blade adapted to be moved into and out of position engaging said contacts, means whereby to cause the parts of the switch blade which are adapted to engage said contacts to move in opposite directions away from the respective contacts, and the structure being of a character such that movement of the door into one of its positions will cause the mentioned portions of the switch blade to move farther away from the respective contacts.

22. A switch mechanism combining a casing having an opening thereinto, a door for the opening movable into two positions, releasable retaining means for the door, a pair of contacts arranged within the casing spaced apart, a switch blade adapted to be moved into and out of position engaging said contacts, connections between said door retaining means and said switch blade whereby to cause the parts of the switch blade which are adapted to engage said contacts to move in opposite directions away from the respective contacts by movement of said retaining means into non-retaining position, and means whereby subsequent movement of the door will cause the mentioned portions of the switch blade to move farther away from the respective contacts.

23. A panel box comprising a relatively stationary part and a relatively movable part, the latter being movable into an open position to give access into the former, a pair of contacts fixed within the relatively stationary part spaced away from each other, a conductor member arranged within the relatively stationary part in a position between said fixed contacts adapted for electrically connecting said fixed contacts together, and means connecting said conductor member with said relatively movable part whereby to bodily shift the conductor member out from between said fixed contacts and into a position affording ready inspection of the conductor member upon opening movement of said movable part, together with means operable to move the conductor member into and out of engagement with said fixed contacts at will while said conductor member is in position between said fixed contacts.

24. A switch mechanism combining a casing having an opening thereinto, a switch blade, manual control means for the switch blade, a displaceable closure member for said opening, a manually operable lock operable independently of the manual control means for the switch blade for preventing displacement of the closure, and the structure being of a character such that an "off" movement of the switch blade preceding a releasing operation of the lock will permit displacement of the closure member.

25. A switch mechanism combining a casing having an opening thereinto, a switch blade, manual control means for the switch blade, a displaceable closure member for said opening, a latch device for the closure member manually operable independently of the manual control means for the switch blade, and connections between the switch blade control means and said latch device of a character to cause the latch device to operate so as to assume a position latching the closure member closed whenever the switch blade is in "on" position.

26. A switch mechanism combining a casing having an opening thereinto, a switch blade, manual control means for the switch blade, a displaceable closure member for said opening, a latch device for the closure

BEST AVAILABLE COP' member manually operable independently of the manual control means for the switch blade, and said latch device being of a character such that it may be operated to unlatch the closure member at any time, together with means in combination, however, requiring an "off" position of the switch blade prior to any opening movement of the closure member.

27. A switch mechanism combining a casing having an opening thereinto, a switch blade, manual control means for the switch blade, a displaceable closure member for said opening, a manually operable lock operable independently of the manual control means for the switch blade for preventing displacement of the closure member, means for causing the switch blade to assume open-circuit position as said lock is manually moved to unlocking position, and said last mentioned means including a part for retaining the switch blade in open-circuit position while the lock remains in unlocking position.

In testimony whereof I affix my signature in the presence of two witnesses.

HUBERT F. KRANTZ.

Witnesses:

MABEL CLARK,

J. A. NEWTON.